INVENTOR.
HERMAN C. SCHEPLER
BY
ATTORNEYS

Dec. 7, 1965

H. C. SCHEPLER 3,221,591

SATELLITE FINDER

Filed Aug. 15, 1961

INVENTOR.
HERMAN C. SCHEPLER
BY
ATTORNEYS

Dec. 7, 1965 H. C. SCHEPLER 3,221,591
SATELLITE FINDER
Filed Aug. 15, 1961 3 Sheets-Sheet 3

INVENTOR.
HERMAN C. SCHEPLER
BY
ATTORNEYS

United States Patent Office 3,221,591
Patented Dec. 7, 1965

3,221,591
SATELLITE FINDER
Herman C. Schepler, 5519 Via Del Valle, Torrance, Calif.
Filed Aug. 15, 1961, Ser. No. 131,689
8 Claims. (Cl. 88—1)
(Granted under Title 35, U.S. Code (1952), sec. 266)

The invention described herein may be manufactured and used by or for the United States Government for governmental purpose without payment to me of any royalty thereon.

This invention relates to an instrument for finding and tracking an object moving in a star-filled sky. More particularly the invention is concerned with providing an apparatus which operates to block out the visible stars and planets allowing an observer to detect and follow the movement of an orbiting object, such as a satellite, as it moves across the celestial sphere.

The relative motion of a satellite with respect to various fixed bodies in the celestial sphere is its distinguishing feature for its detection and tracking. It is generally extremely difficult to locate a satellite in a star-filled sky where each star resembles a potential satellite to a searching observer. Each star must be checked for lack of motion and the psychologically apparent motion of a fixed star presents an additional handicap to the observer searching for the orbiting satellite.

The present invention discloses an optical and mechanical arrangement whereby the bodies generally present in the celestial sphere are effectively blocked out by a mask in the field of view of a telescope while the area between the bodies is clearly visible to the observer searching the sky through the telescope for a satellite. The satellite as it passes through these unblocked areas is easily seen by the observer and is always visible except in the rare instances when it may pass directly between a star, planet, or the moon and the observer.

Accordingly, it is an object of the present invention to provide apparatus which is useful for distinguishing the presence of a satellite in the celestial sphere from the planets and stars that are permanently situated therein.

Another object of the invention is to provide a telescope through which the observer sees only the portion of the celestial sphere not occupied by heavenly bodies.

Still another object of the invention is to provide a telescope having a mask in its field of view upon which a series of opaque areas are placed corresponding to the fixed stars, thereby blocking out the light emitted by the stars and allowing unrestricted view of the area therebetween.

A still further object of the invention is to provide an optical arrangement whereby a transparent spherical member having opaque star images disposed thereon is interposed between the eyepiece and objective lens of a telescope preventing the light from the stars from reaching the eyes of the observer.

These and many other objects, features and advantages, such as the provision of photoelectric means for monitoring the movement of the satellite as it orbits around the earth, will become more apparent from the following description taken in connection with the illustrative embodiments depicted in the accompanying drawings wherein.

Figure 1:
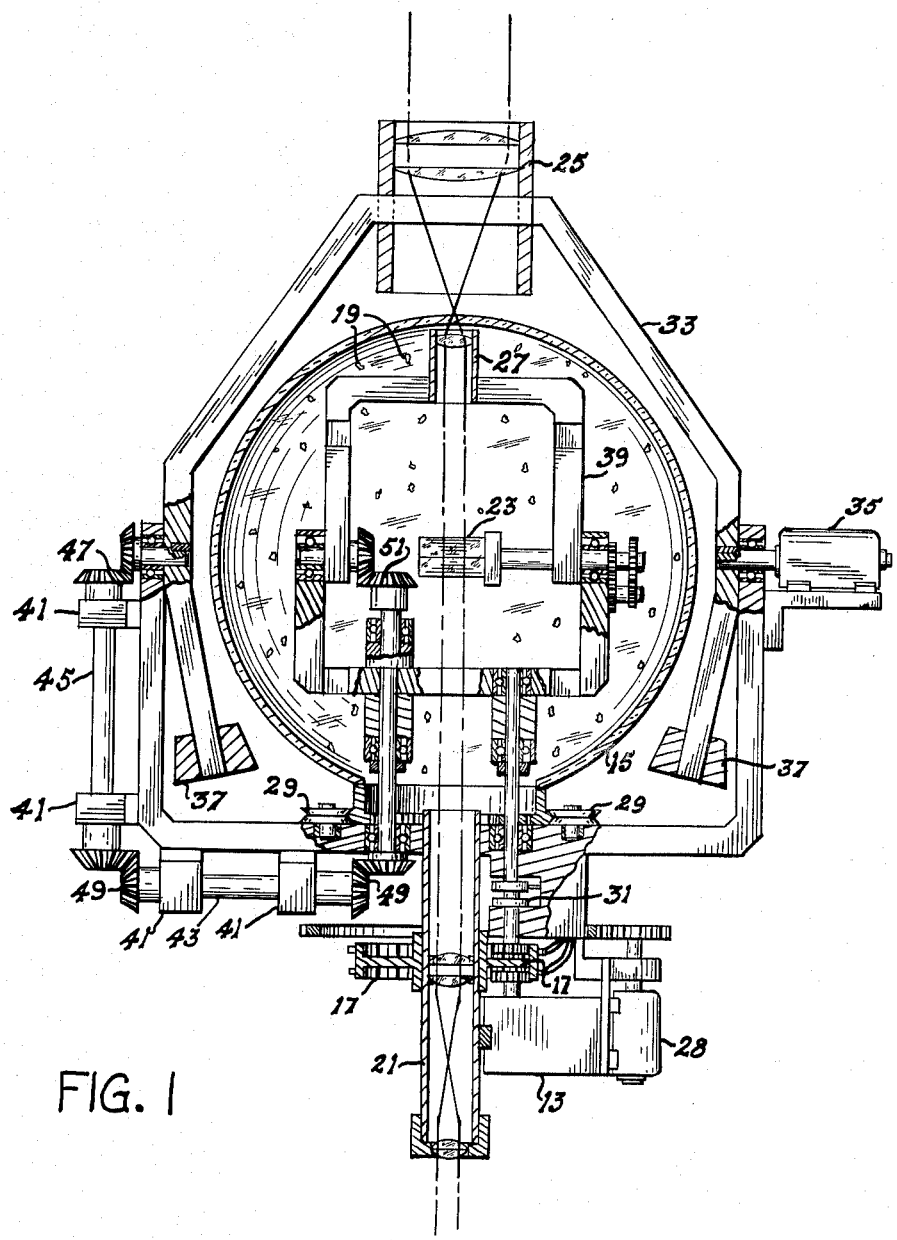
FIG. 1 is a view in partial cross-sectional of the satellite finder showing the mechanical and optical details of construction.
Figure 2:
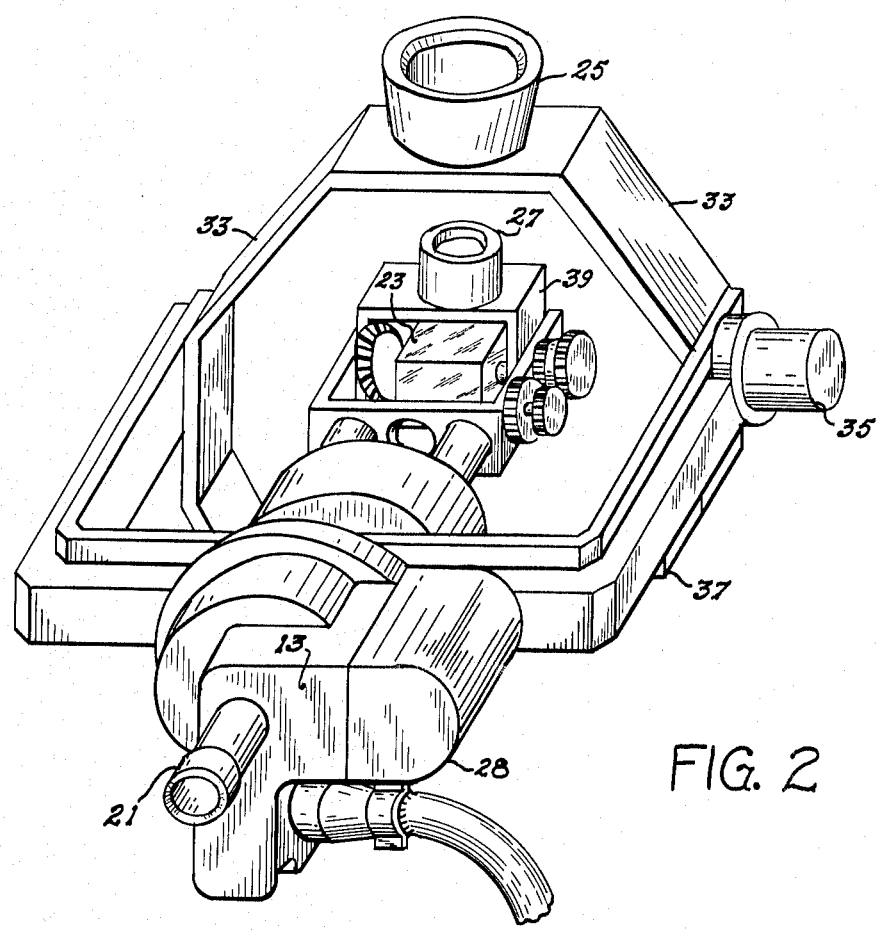
FIG. 2 is an isometric view of the apparatus of FIG. 1.

Referring now to FIG. 1 there is shown a view in partial section of the satellite finder which includes a timer motor 13 which is essentially a clock drive for synchronizing the rotation of the globe 15 with that of the earth. The celestial globe 15 fabricated from a transparent plastic material is driven by the timer motor 13 through the internal gear and pinion system 17 and once the axis of the globe 15 is oriented with respect to the earth about its axis of rotation, engaging the timer motor 13 will keep the globe and earth rotations synchronized. The opaque images 19 included on the transparent globe 15 are positioned to represent heavenly bodies in their respective locations in the sky and may be applied to the globe by photographic or hand transfer techniques.

The satellite finder also includes an optical arrangement for viewing the orbiting satellite. An eyepiece 21 is provided through which the observer may view a rotatable prism 23 located at the geometric center of the globe 15. An objective lens system 25 having its focal plane coincident with the surface of globe 15 is included in the optical arrangement and serves to direct the image of the celestial sphere toward the prism 23 and focus it on the surface of globe 15. The field lens 27 is interposed between the prism 23 and the objective 25 serving to reverse the image and diminish the size of the field.

The axis drive motor 28 drives the entire mechanism around the axis of sight. The globe 15 is kept in registry with the earth during this rotation through the internal gear and pinion system 17. A series of grooved bearings 29 are provided to allow the globe to rotate about the main axis while at the same time preventing translation along the axis. A clutch system 31, when engaged, serves to connect the mechanism to the timer motor 13 causing the optical elements to rotate in synchronism with the globe 15.

The objective lens system 25 is attached to an external yoke 33 which rotates about an axis perpendicular to the polar axis and passing through the center of the globe 15. A drive motor 35 is provided for driving the yoke 33 about its perpendicular axis. Adjustable weights 37 are attached to the open ends of the yoke 33 and serve to counter balance the off-center weight of the optical elements.

The field lens system 27 is mounted on an internal yoke 39 which also rotates about an axis perpendicular to the polar axis of the globe 15. The internal yoke 39 is located within the globe 15 while the external yoke 33 moves around the outside of the globe. The prism 23 is also attached to the internal yoke 39 and includes a gear drive arrangement which serves to reduce the angular velocity of the prism 23 by a factor of two relative to the internal yoke 39.

A series of pillow blocks 41 serve to hold the journals which serve as bearings for the shafts 43 and 45. Matched sets of bevel gears 47, 49, and 51 provide means for synchronizing the movement of the external yoke 33 and the apparatus attached thereto with the internal yoke 39 having the prism 23 and field lens 27 mounted thereon.

In the operation of the satellite locator the timer motor 13 is energized causing the transparent globe 15 with opaque star images 19 affixed thereon to rotate about its polar axis at the same rate as the earth rotates, that is, a certain number of are degrees per unit of time. When properly aligned, this procedure synchronizes the movement of the globe 15 with the apparent movement of the heavenly bodies across the sky. Thus, the opaque star images 19 on the globe 15 effectively block the light emitted by the stars from going within the globe 15.

By looking into the eyepiece 21 of the telescope which is focused on the surface of globe 15, the observer sees the globe and the opaque star images thereon. The objective lens system 25, which has a focal plane coincident with the surface of globe 15, serves to focus the actual star images from the celestial sphere onto the surface of the globe 15. Since the globe is oriented and adjusted so as to bring the opaque star images 19 into registration with the celestial star images, an observer looking through the telescope eyepiece finds all the stars obliterated. Any object, such as a satellite, which is located in the field of view between the stars, would be clearly visible through the transparent portion of the globe 15 and could be easily followed across the sky. The confusing and distracting effect of the many stars and planets would be eliminated.

Figure 3:
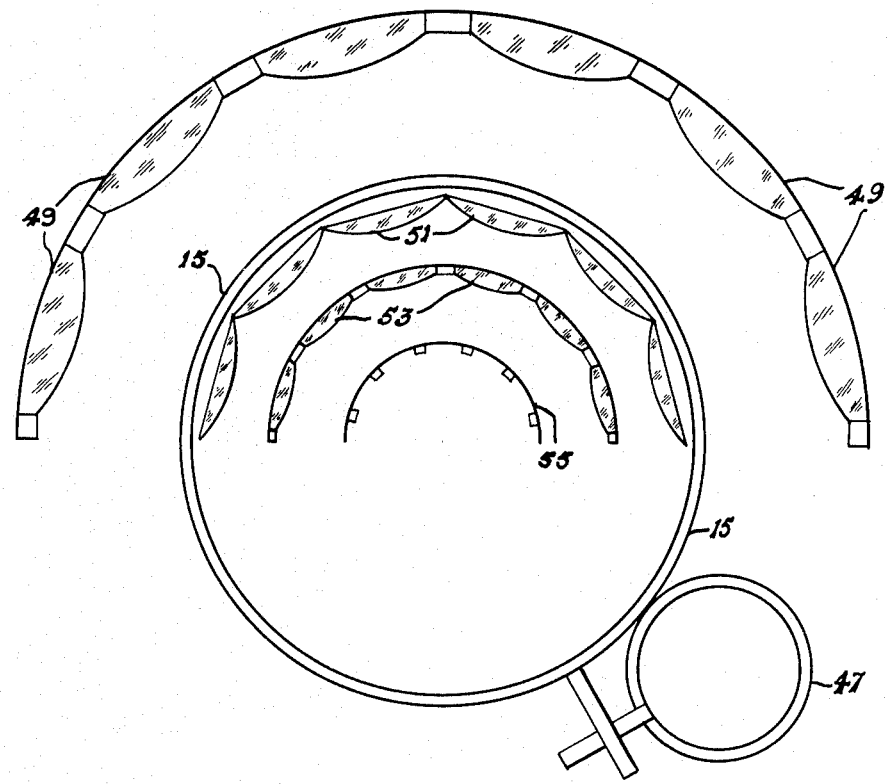
FIG. 3 is a schematic view of an embodiment of the invention utilizing the characteristics of photoelectric tubes.

Another embodiment of the Satellite Finder is shown in FIG. 3. In this type of instrument the optical elements remain fixed and do not scan the celestial area. As in the case of the scanner type finder, the equatorially mounted transparent celestial globe 15 is driven by a clock motor 47. Instead of a single telescopic objective and eyepiece, a series of objectives 49 are mounted in a hemisphere and simultaneously project images of all the stars in the celestial hemisphere onto the celestial globe 15. Inside the globe 15, near its surface, there lies a corresponding series of field lenses 51 which serve to direct any unblocked image to a third series of field imaging lenses 53. Each objective lens 49 has a corresponding field lens 51 and imaging lens 53 located within the celestial globe 15. The satellite image thus projected falls upon one of the photoelectric detectors 55 located near the center of the celestial globe 15. Each of the lens systems is provided with a corresponding detector 55.

In monitoring the movement of a satellite across the sky, it only becomes necessary to determine which of the detectors is being affected thereby determining the area of the hemisphere in which the satellite is moving. Other equipment can be controlled by the signal from the detector so that the satellite can be monitored as it moves across the sky. In this embodiment shown in FIG. 3 only the clock driven celestial globe 15 moves, all other parts are stationary and remain in the same relative position.

From the foregoing it will be seen that the invention has been presented with particular emphasis on certain preferred embodiments. It will be apparent to one skilled in the art that certain changes, alterations, modifications and substitutions can be made in the arrangement and location of the various elements without departing from the spirit and scope of the invention as defined in the amended claims.

Having thus set forth and disclosed the nature of my invention, what I claim is:

1. An astronomical instrument for observing objects in the celestial sphere, said instrument comprising a transparent hollow globe having opaque portions imprinted thereon corresponding to heavenly bodies in the celestial sphere, means for synchronizing the rotation of said globe on its polar axis with that of the earth's, and aligned optical means within and without said globe for focusing an image of the celestial sphere on the surface of said globe and to allow simultaneous visual observation of the image of the celestial sphere and surface of said globe, the opaque portions on said globe being in register with the heavenly bodies to prevent their images from reaching the inner optical means.

2. An astronomical instrument for observing objects in the celestial sphere, said instrument comprising a transparent hollow globe having opaque portions imprinted thereon corresponding to heavenly bodies in the celestial sphere, means for synchronizing the rotation of said globe on its polar axis with that of the earth's, first optical means disposed near the outer surface of said globe for focusing images of the heavenly bodies thereon, second optical means for observing the surface of said globe, said second optical means being in optical alignment with said first optical means, both of said optical means interacting to allow observation of said celestial sphere, the opaque portions on said globe being in register with the heavenly bodies to prevent their images from reaching said second optical means.

3. The astronomical instrument defined in claim 2 wherein a plurality of photoelectric detectors are disposed near the center of said globe, said detectors being in alignment with said first and second optical means for receiving and converting the signal image therefrom.

4. The astronomical instrument defined in claim 2 wherein said first optical means includes objective and eyepiece elements in optical alignment with each other, said objective elements being movable for scanning the celestial sphere.

5. An astronomical instrument for observing relatively fast moving objects in the celestial sphere, said instrument comprising a transparent hollow globe having opaque portions imprinted thereon, said opaque portions being in register with and effective to prevent passage of light from heavenly bodies to the inside of said globe, means for synchronizing the rotation of said globe with the earth's to retain said opaque portions in register with said heavenly bodies, reflecting means disposed within said globe for directing the line of sight of the observer through predetermined portions of said transparent globe, optical means in alignment with said reflecting means for focusing and visually observing the field of view on the surface of said globe, and means for scanning the celestial sphere by moving said optical means relative to said globe to allow the observer to inspect the area of celestial sphere between the heavenly bodies, the light from said heavenly bodies being blocked by said opaque portions.

6. The astronomical instrument defined in claim 5 wherein the reflecting means comprises a prism disposed at the geometric center of said globe, said prism being synchronously rotatable with said optical means such that the optical alignment of said optical means is maintained during the scanning operation.

7. An astronomical instrument for observing relatively fast moving objects in the celestial sphere, said instrument comprising a transparent hollow globe having opaque portions imprinted thereon, said opaque portions being in register with and effective to prevent passage of light from heavenly bodies to the inside of said globe, means for synchronously rotating said globe on its polar axis to retain said opaque portions in register with said heavenly bodies, an objective lens having a focal plane coincident with the surface of said globe disposed near the outer surface of said globe, an eyepiece optically alignable with said objective lens and focused on the surface of said globe, reflecting means disposed within said globe for maintaining said objective lens and eyepiece in optical alignment with each other, and means for scanning said celestial sphere by moving said objective lens relative to said globe to allow the observer to inspect the area of the celestial sphere between the heavenly bodies, the light from said heavenly bodies being blocked by said opaque portions.

8. The astronomical instrument defined in claim 7 wherein a field lens is disposed near the inner surface of said globe, said field lens serving to diminish the field size and reverse the image.

References Cited by the Examiner

UNITED STATES PATENTS

| | | | |
|---|---|---|---|
| 548,868 | 10/1895 | Drew | 88—1 |
| 2,039,878 | 5/1936 | Boykow | 88—2.3 |
| 2,604,601 | 7/1952 | Menzel | 250—203 |
| 2,792,742 | 5/1957 | Scott et al. | 88—2.3 |

FOREIGN PATENTS 124,571  11/1901  Germany.

JEWELL H. PEDERSEN, *Primary Examiner.*